(12) United States Patent
Wyszynski et al.

(10) Patent No.: US 12,137,390 B2
(45) Date of Patent: Nov. 5, 2024

(54) METHOD OF PERFORMING LOCATION DEPENDENT ACTIONS IN VEHICLE

(71) Applicant: Aptiv Technologies AG, Schaffhausen (CH)

(72) Inventors: Grzegorz Wyszynski, Cracow (PL); Krzysztof Holon, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 280 days.

(21) Appl. No.: 17/643,804

(22) Filed: Dec. 10, 2021

(65) Prior Publication Data

US 2022/0217501 A1 Jul. 7, 2022

(30) Foreign Application Priority Data

Jan. 5, 2021 (EP) .................................... 21150284

(51) Int. Cl.
*H04W 4/029* (2018.01)
*B60R 25/24* (2013.01)
(Continued)

(52) U.S. Cl.
CPC ........... *H04W 4/029* (2018.02); *B60R 25/245* (2013.01); *G01C 17/28* (2013.01); *B60R 25/01* (2013.01); *B60R 25/209* (2013.01)

(58) Field of Classification Search
CPC ... H04W 4/029; H04W 12/08; H04W 12/122; H04W 12/63; H04W 4/40; H04W 84/18;
(Continued)

(56) References Cited

U.S. PATENT DOCUMENTS

| 2012/0105198 A1* | 5/2012 | Nakashima | ............. B60R 25/24 340/13.24 |
|---|---|---|---|
| 2015/0168544 A1 | 6/2015 | Ette et al. | |

(Continued)

FOREIGN PATENT DOCUMENTS

| DE | 102011104230 | 4/2012 |
|---|---|---|
| DE | 102017107832 | 10/2018 |
| WO | 2020118362 | 6/2020 |

OTHER PUBLICATIONS

Watanabe, et al., "A three-dimensional smartphone positioning method using a spinning magnet marker", Oct. 2017, 7 pages.

*Primary Examiner* — Tyler J Lee
*Assistant Examiner* — Yufeng Zhang
(74) *Attorney, Agent, or Firm* — Harness, Dickey & Pierce, P.L.C.

(57) ABSTRACT

The method for performing location dependent actions in a system having a motor vehicle and a mobile communication device connected to the motor vehicle via a short-range radio connection, said motor vehicle having N rotating magnets with N≥1, includes the following steps performed by the motor vehicle at each request for performing an action: A) setting N new frequency(ies), each frequency being assigned to one of the N magnet(s); B) rotating the N magnet(s) at the N respective frequency(ies); C) receiving values of a magnetic field of each of the N magnet(s) detected by the mobile communication device; D) estimating a position of the mobile communication device from the received values; and E) controlling the execution of the requested action when the estimated position is allowable.

20 Claims, 4 Drawing Sheets

(51) Int. Cl.
*G01C 17/28* (2006.01)
*B60R 25/01* (2013.01)
*B60R 25/20* (2013.01)

(58) Field of Classification Search
CPC ..... B60R 25/245; B60R 25/01; B60R 25/209;
G01C 17/28; G07C 2009/00412; G07C
2009/00769; G07C 2209/63; G07C
9/00309
See application file for complete search history.

(56) References Cited

U.S. PATENT DOCUMENTS

| | | | |
|---|---|---|---|
| 2015/0179332 A1* | 6/2015 | Ette | G01S 5/0226 |
| | | | 336/170 |
| 2018/0326946 A1* | 11/2018 | Bocca | B60R 25/24 |

\* cited by examiner

METHOD OF PERFORMING LOCATION DEPENDENT ACTIONS IN VEHICLE

CROSS-REFERENCE TO RELATED APPLICATION

This application claims priority to European Patent Application Number 21150284.4, filed Jan. 5, 2021, the disclosure of which is hereby incorporated by reference in its entirety herein.

BACKGROUND

The present disclosure relates to performing location dependent actions in a motor vehicle upon requests from a mobile communication device. Such actions may be to unlock the vehicle, start the vehicle engine, turn on vehicle lights, etc.

It is known to use a smartphone as a car key to operate a car, or more generally a motor vehicle, typically to unlock and start the car. When the user approaches the car, a control system of the car detects the smartphone for example via Bluetooth detection. The smartphone may be authorized to unlock the car or start the engine when the smartphone's position is allowable. Typically, the car can be unlocked when the smartphone is localized in the vicinity of the car, at a maximum distance of a few meters from the car and started when the smartphone is localized inside the car.

Using the smartphone as a key to unlock or start the car requires to localize accurately the smartphone. To this end, a known solution consists in detecting the strength of Bluetooth signals received by the car, or the control system of the car, to estimate the position of the smartphone. Such a solution requires many Bluetooth devices in the car.

Other solutions based on Bluetooth related positioning methods require out-of-specification features in the Bluetooth controller of the smartphone. These solutions are not compatible with existing smartphones.

Another issue is to ensure the safety of the car against a cyberattack like a relay station attack. In a relay station attack, two people (or attackers) are necessary. A first attacker is positioned next to the car and a second attacker is positioned next to the key. The first attacker intercepts the authentication messages from the car and relays them to the second attacker. The second attacker communicates with the key to get the authentication.

The present disclosure improves the situation with a method of performing location dependent actions in a motor vehicle upon requests from a mobile communication device connected to the motor vehicle via a local wireless connection, that allows to localize precisely the mobile communication device without requiring unusual specifications and to ensure the security of the vehicle, in particular against relay station attacks.

SUMMARY

The present disclosure concerns a first method for performing location dependent actions in a system having a motor vehicle and a mobile communication device connected to the motor vehicle via a short-range radio connection, said motor vehicle having N rotating magnets with N≥1, including the following steps performed by the motor vehicle at each request for performing an action: A) setting N new frequency(ies), each new frequency being assigned to one of the N magnet(s); B) rotating the N magnet(s) at the N respective new frequency(ies); C) receiving values of a magnetic field of each of the N magnet(s) detected by the mobile communication device; D) estimating a position of the mobile communication device from the received values; and E) controlling the execution of the requested action when the estimated position is allowable.

Advantageously, the N new frequency(ies) are selected randomly or pseudo-randomly.

The present method estimates the position of the mobile communication device by applying a positioning method as disclosed in the article "A three-dimensional smartphone positioning method using a spinning magnet marker", published in 2017 Tenth International Conference on Mobile Computing and Ubiquitous Network (ICMU) by IEEE (Electronic ISBN:978-4-907626-31-0, DOI: 10.23919/ICMU.2017.8330076). This method allows to detect the precise three-dimensional (3D) position of a smartphone using a Spinning Magnet Marker (SMM), that is a rotating magnet. A magnetic sensor of the smartphone detects the magnetic field generated by the rotating magnet via a frequency analysis, and the 3D position of the smartphone is estimated with an accuracy of better than several tens of centimeters.

The present method can be used by existing communication devices, typically smartphones, that are already in the market and generally equipped with a magnetic sensor. It allows an accurate positioning of the communication device. In the present disclosure, in order to detect the positions of a mobile communication device connected to the vehicle, the vehicle has one or more magnets and the frequencies to rotate these one or more magnets are changed at each request for performing an action. For example, these frequencies are picked at random (or selected pseudo-randomly). This makes the system more resistant to relay station attacks. Indeed, in case of a relay station attack, an attacker would have to first find the frequencies of rotation of magnet(s) that change at each request and are for example selected randomly or pseudo-randomly. Also, in case of a relay station attack, when more than one magnets are used in the vehicle, the same magnet configuration would have to be reproduced by the attacker close to the key, which renders the attacker's task more difficult.

Advantageously, the random or pseudo-random selection of the N frequency(ies) is performed by the motor vehicle. It is safer that the motor vehicle makes the random selection of the one or more frequencies. Alternatively, the random or pseudo-random selection of the N frequency(ies) could be performed by the mobile communication device.

Advantageously, the N frequency(ies) are encrypted by the motor vehicle and then transmitted to the mobile communication device via the short-range radio connection.

The one or more frequencies are preferably encrypted before transmission from one side to the other side, which allows to improve the security and be more robust against relay station attacks.

The position of the mobile communication device can be estimated by comparing values of orthogonal components $H_x$, $H_y$, $H_z$ of the magnetic field with a look-up table stored in the motor vehicle.

Alternatively, the position of the mobile communication device can be estimated by estimating a distance $d_i$ between the mobile communication device and each of the N magnet(s) based on the following equation:

$$d_i = \left(\frac{B_i - D}{A}\right)^{-\frac{1}{C}},$$

where i is a magnet index, Bi is a magnitude of the detected magnetic field of said magnet, and A, C and D are predetermined constants.

In some embodiments, the steps A) to D) are executed twice to estimate two consecutive positions of the mobile communication device and, in the step E), the requested action is performed when the two estimated positions are allowable. For a first execution of the steps A) to D), N first frequency(ies) are selected randomly or pseudo-randomly by one of the motor vehicle and the mobile communication device, and, for a second execution of the steps A) to D), N second frequency(ies) are selected randomly or pseudo-randomly by the other of the motor vehicle and the mobile communication device. In such a case, there are two sources of random or pseudo-random frequencies: the vehicle and the communication device. This adds much security to the method.

In that case, optionally, the two estimated positions are compared with one another and the requested action is performed when the two estimated positions are coherent with one another. Typically, if the two estimated positions are close enough, the position of the communication device is determined.

Advantageously, the method includes an initial step of establishing the short-range radio connection between the motor vehicle and the mobile communication device, including an authentication of the mobile communication device by the motor vehicle.

The present disclosure also concerns a second method for performing location dependent actions in a system having a motor vehicle and a mobile communication device connected to the motor vehicle via a short-range radio connection, said motor vehicle having N rotating magnet(s) with N≥1 and the mobile communication device having a magnetic sensor, including the following steps performed by the mobile communication device at each request for performing an action: obtaining N new frequency(ies), each new frequency being assigned to one of the N magnet(s); measuring a global magnetic field with the magnetic sensor; performing a frequency analysis using the N new frequency(ies) to detect values of a magnetic field of each of the N magnet(s); and transmitting the values of the magnetic field of each of the N magnet(s) to the motor vehicle, so that the motor vehicle estimates a position of the mobile communication device from the received values and controls execution of the requested action when the estimated position is allowable.

The present disclosure also concerns a control system for a motor vehicle, having a short-range radio transceiver, N rotating magnet(s) with N≥1, hardware means, and software means for executing the steps of the first method previously defined.

In other words, the present disclosure concerns a control system for a motor vehicle having a short-range radio transceiver, N rotating magnet(s) with N≥1, and hardware components and software components, for executing the steps of the first method previously defined. The hardware components can include a processor (or a control unit) and one or more memory components for storing software instructions and/or data.

The present disclosure also concerns a motor vehicle including the control system above defined.

The present disclosure also concerns a first computer program including instructions to cause the above defined control system to execute the steps of the first method previously defined.

The present disclosure also concerns a first computer-readable medium having stored thereon the above defined first computer program.

The present disclosure also concerns a mobile communication device having a short-range radio transceiver, a magnetic sensor, and hardware means and software means for executing the steps of the second method previously defined.

In other words, the present disclosure also concerns a mobile communication device having a short-range radio transceiver, a magnetic sensor, and hardware components and software components, for executing the steps of the second method previously defined. The hardware components can include a processor (or a control unit) and one or more memory components for storing software instructions and/or data.

The present disclosure also concerns a second computer program including instructions to cause the above defined mobile communication device to execute the steps of the second method previously defined.

The present disclosure also concerns a second computer-readable medium having stored thereon the above defined second computer program.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

Figure 1:
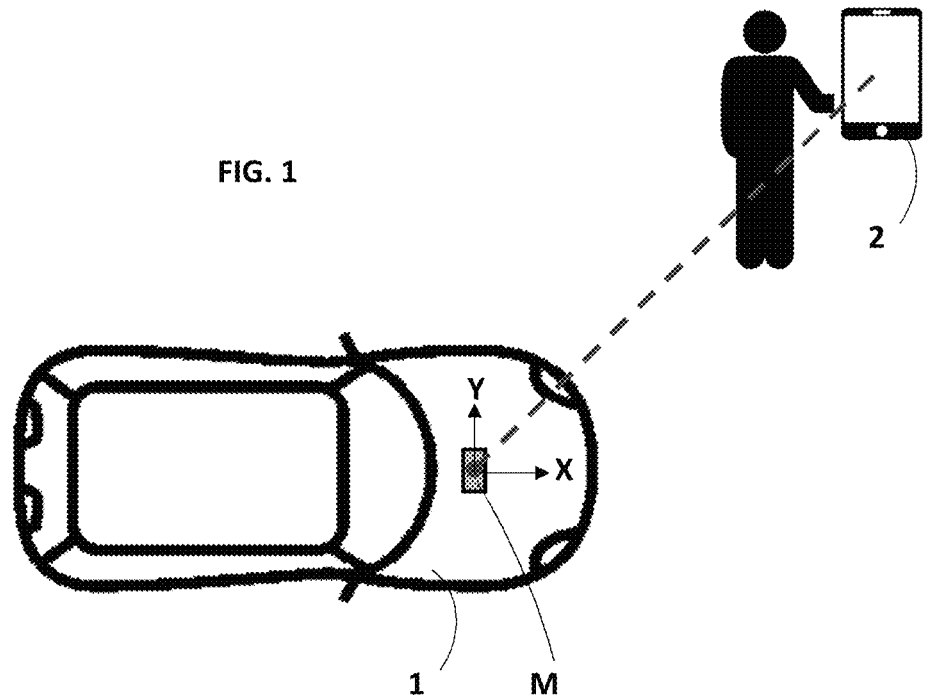
FIG. 1 shows a system for performing location dependent actions in a motor vehicle upon requests from a mobile communication device, according to a first embodiment.

FIG. 1 shows a system including a motor vehicle 1, for example a car, and a mobile communication device 2, for example a smartphone, that can connect wirelessly to the vehicle 1. The vehicle 1 can perform location dependent actions requested by the mobile communication device 2 and/or request location dependent actions to the mobile communication device 2.

A location dependent action can be defined as an action whose execution depends on the position of the mobile communication device 2 with respect to the motor vehicle 1. The action can be requested by the mobile communication device 2 or by the vehicle 1. The action may be to unlock or lock the vehicle doors, or to start or stop the vehicle engine, or to light up the path to the vehicle with a light of the mobile communication device. In the first and third cases (lock/unlock and lighting up a path), the action can be authorized when the mobile communication device 2 is located next to the vehicle 1, within a certain range, usually 5-20 meters, of the vehicle 1. In the second case, the action (start/stop) can be authorized when the mobile communication device is inside the vehicle.

The motor vehicle 1 is equipped with a control system 100 having: a short-range radio transceiver 10, a magnetic node 11, a central module 12, a memory 13 storing information related to one or more mobile communication devices paired with the vehicle 1, and a memory 14 storing a lookup table T.

The short-range radio transceiver 10 implements wireless communication protocol(s), here Bluetooth protocol(s). Alternatively, any other wireless communication protocol(s) could be used, for example Wi-Fi protocol(s) from IEEE 802.11 standards.

Figure 2:
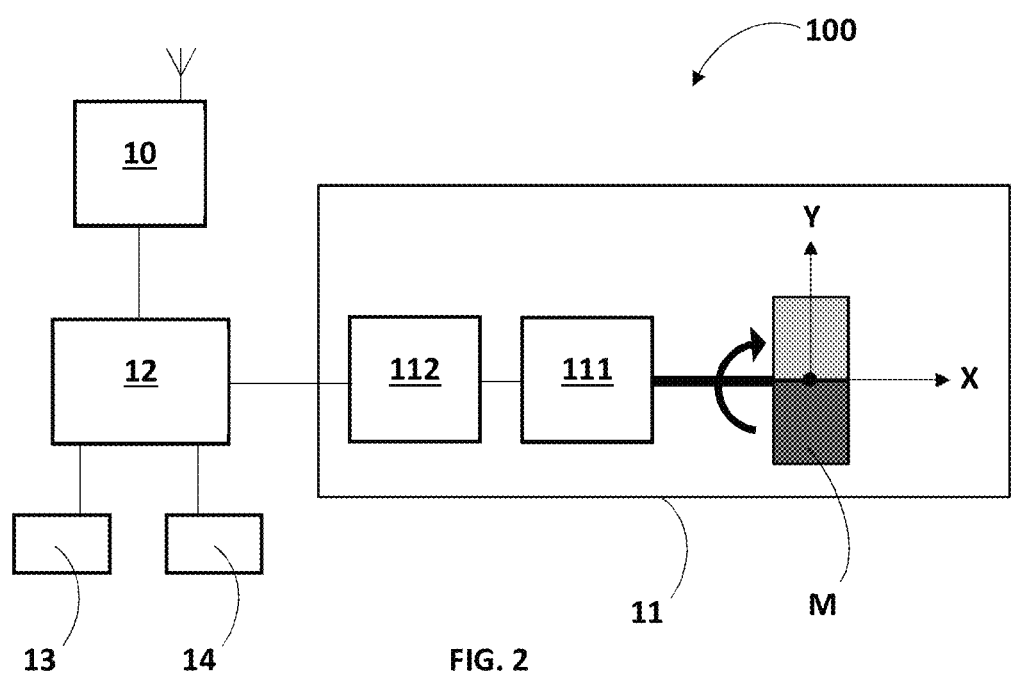
FIG. 2 shows a schematic block diagram of the vehicle of FIG. 1.

As shown in FIG. 2, the magnetic node 11 has: a rotating magnet M, a motor 111, here a DC motor, to rotate the magnet M, and a motor controller 112 to control rotation of the motor 111.

In the present embodiment, the magnet M is a permanent magnet. For example, it has a bar shape with a north magnetic pole and a south magnetic pole on opposing longitudinal sides of the bar. It can rotate around a X axis, in a plane YZ, in a cartesian coordinate system X, Y, Z, as shown in FIG. 2 (Z being orthogonal to the plane XY). It is mounted on a rotating shaft of the motor 111. The motor controller 112 controls the motor 111 and the rotation speed of the motor 111 to rotate the magnet M depending on a frequency $f_1$ set by the central module 12, as will be explained later.

The central module 12 controls operation of the vehicle system 100. It has hardware means and software means for operating the vehicle system 100 and for controlling the execution of the steps performed by the vehicle 1 in the method of performing location dependent actions in the system including the vehicle 1 and the mobile communication device 2, that will be described later. In other words, the central module 12 has hardware components such as a processor (or control unit) and one or more memory components for storing software instructions and other data. These location dependent actions can be to lock and unlock the vehicle doors, to start or stop the vehicle engine, to turn on or turn off the lights of the vehicle 1, to turn on a light of the communication device 2 in order to light up a path to the vehicle 1 or any other action related to the vehicle 1 and/or the communication device 2.

Figure 3:
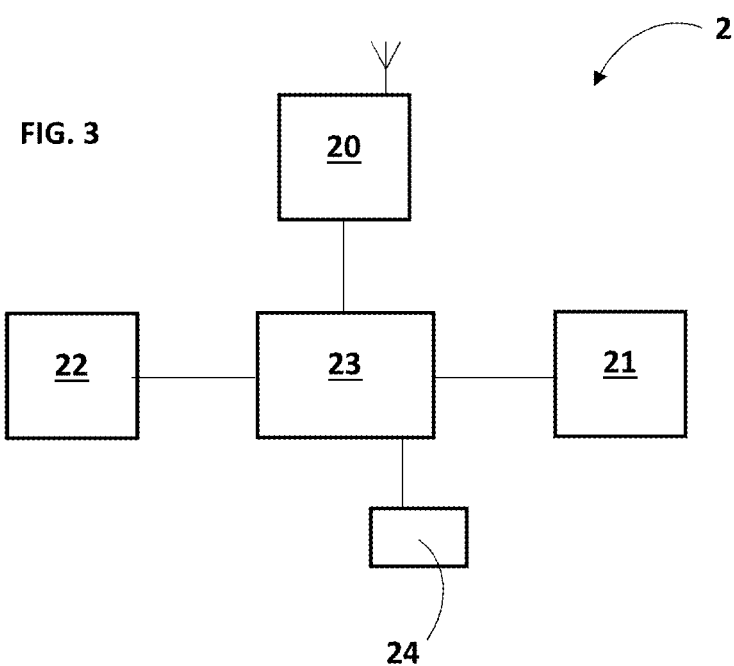
FIG. 3 is a schematic block diagram of the mobile communication device of FIG. 1.

As shown in FIG. 3, the mobile communication device 2 has: a short-range radio transceiver 20, a magnetic sensor 21, an orientation sensor 22, a central module 23, and a memory 24 storing information related to one or more vehicles paired with the mobile communication device 2.

The mobile communication device 2 is for example a smartphone.

The short-range radio transceiver 20 implements wireless communication protocol(s), here Bluetooth protocols. Alternatively, it could implement any other wireless communication protocol(s), for example Wi-Fi protocol(s) from IEEE 802.11 standards or Wi-Fi (a standard from IEEE 802.11 standards).

The magnetic sensor 21 measures a magnetic field at the position of the mobile communication device 2.

The orientation sensor 22 is for example an accelerometer used to sense the orientation of the mobile communication device 2.

The central module 23 controls operation of the communication device 2. It has hardware means and software means for operating the communication device 2 and for controlling the execution of the steps performed by the mobile communication device 2 in the method of performing location dependent actions in a system having a motor vehicle (1) and a mobile communication device, that will be described later.

The mobile communication device 2 is a user equipment having wireless communication means (i.e. hardware and software components for communicating wirelessly). It can be a smartphone, a tablet, a laptop, a wireless remote-control device like a key fob, or any other type of mobile (wireless) communication device.

The vehicle 1 and the mobile communication device 2 have been initially paired (here via the Bluetooth). An information related to the pairing is stored in the memory 13 of the vehicle 1. Another information related to the pairing is stored in the memory 24 of the mobile communication device 2. After the initial pairing, the vehicle 1 and the mobile communication device 2 can connect automatically via a local (short-range) wireless connection (here a Bluetooth connection) when the mobile communication device 2 is next to the vehicle 1, within a radio coverage area of the vehicle 1, or inside the vehicle 1. The radio coverage area of the vehicle 1 can be a circular area centered on radio transceiver 10. It corresponds to the effective range of the radio transceiver 10. The range of the radio transceiver 10 depends on its type. For a Bluetooth transceiver, the range is power-class-dependent and depends on a class of the Bluetooth device, as well known by the skilled person. For example, Class 3 Bluetooth devices have a range of up to 1 meter, Class 2 Bluetooth devices have a range up to 10 meters, and Class 1 Bluetooth devices have a range up to 100 meters. The effective range of the radio transceiver 10 varies depending on various parameters (like propagation conditions, production sample variations, antenna configurations, etc.).

When the initial pairing is performed, the vehicle 1 and the mobile communication device 2 generate secret cryptographic keys to implement security in the wireless communications between the vehicle 1 and the mobile communication device 2. The secret key(s) can be stored in a secure area of each of the memory 13 of the vehicle 1 and the memory 24 of the device 2. The key management can be defined by standards (here Bluetooth protocol standards) and will not be described in detail in the present disclosure.

Figure 4:
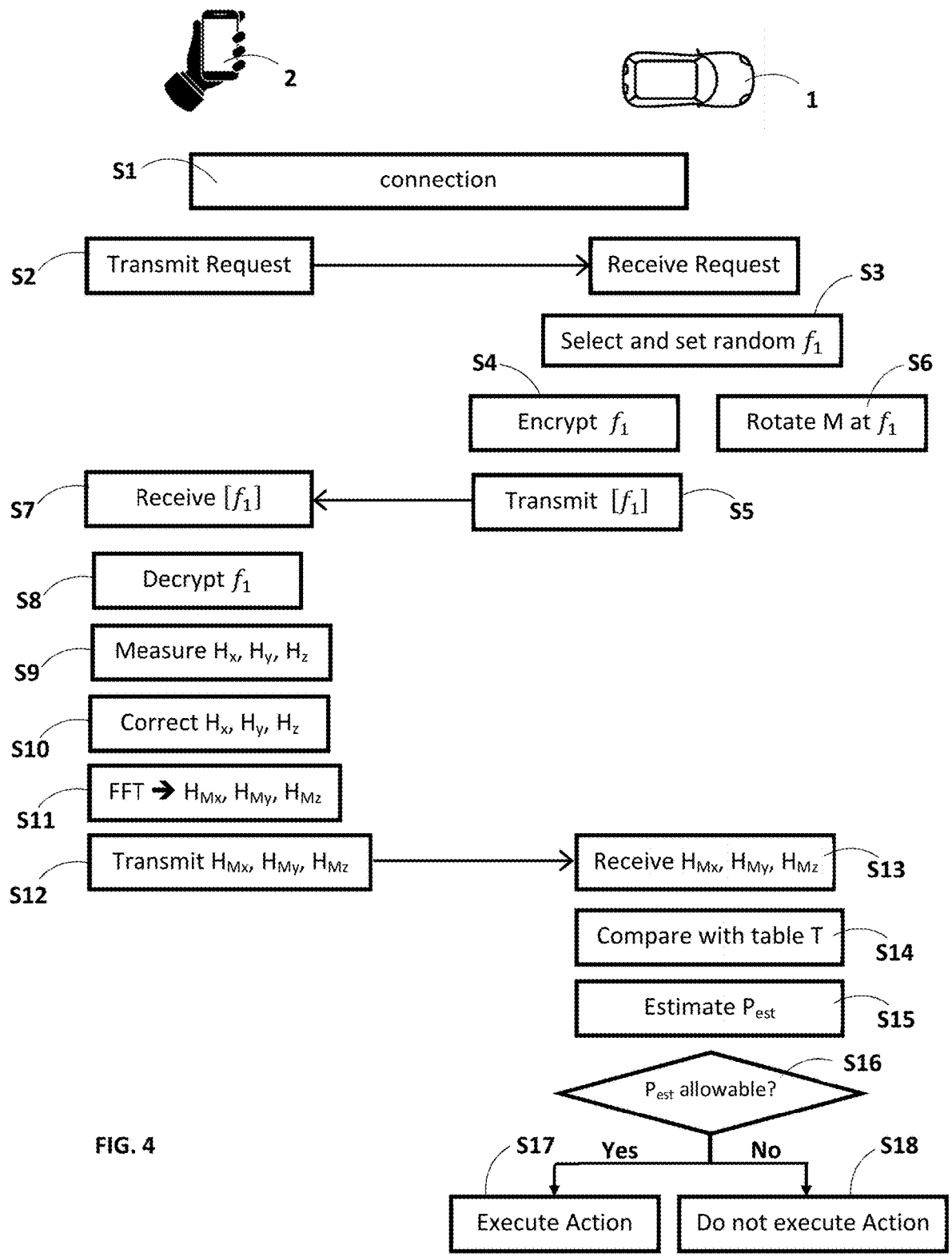
FIG. 4 shows a flowchart of a process of performing a location dependent action in the motor vehicle upon request from the mobile communication device, according to a first embodiment.

FIG. 4 illustrates a first method, performed by the vehicle 1, and a second method, performed by the mobile communication device 2, for performing a location dependent action in the system including the vehicle 1 and the mobile communication device 2, according to a first embodiment.

For example, the action is to unlock the vehicle doors on request from the mobile communication device 2.

This example is only illustrative and any other type of action (start or stop the vehicle engine, turn on or off vehicle lights, etc.) could be requested by the mobile communication device 2 and performed by the vehicle 1, or requested by the vehicle 1 and performed by the mobile communication device 2.

In a first step of connection S1, typically when the mobile communication device 2 approaches the vehicle 1 and enters the radio coverage range of the vehicle 1 (i.e. of the radio transceiver 10), the vehicle 1 and the mobile communication device 2 connect automatically, here via a Bluetooth connection. In the step of connection S1, an authentication is performed to allow the vehicle 1 to authenticate the mobile communication device 2, and reciprocally. A secure connection is set up between the vehicle 1 and the mobile communication device 2 so that data transmitted over radio signals between the vehicle 1 and the mobile communication device 2 is encrypted using at least one secret key k shared by both sides.

In a step S2, a request from the mobile communication device 2 to unlock the vehicle's doors is made to the vehicle 1. This request can be entered by a user of the mobile communication device 2 and transmitted from the mobile communication device 2 to the vehicle 1 via the Bluetooth connection, or it can be automatically generated by the mobile communication device 2 and transmitted via the Bluetooth connection to the vehicle 1 upon connection of the mobile communication device 2 to the vehicle 1. Alternatively, the request to unlock may result from connection establishment. In the present example, the request for action is received by the vehicle 1 (or vehicle system 100).

In a step S3, in response to the request, the vehicle 1 selects a new frequency $f_1$ to rotate the magnet M. In other words, the frequency $f_1$ to rotate the magnet M is changed at each request to perform an action in the system including the vehicle 1 and the communication device 2. In the present embodiment, the frequency $f_1$ is picked at random. Alternatively, the frequency $f_1$ could be selected pseudo-randomly. The frequency $f_1$ is advantageously less than half a maximum sampling frequency $F_{max}$ of the mobile communication device 2:

$$f_1 \le \frac{F_{max}}{2}.$$

This frequency $F_{max}$ can be transmitted by the mobile communication device 2 during the initial pairing and stored in memory by the vehicle 1. Alternatively, the frequency $F_{max}$ is an information pre-stored in the vehicle 1 by any other means. Due to the low frequency of the magnetic field of the magnet M, the positioning of the communication device is less prone to varying environment. Indeed, low frequency fields penetrate better materials. This low frequencies (typically less than 100 Hz) can be even described as static magnetic field (so-called quasi-static magnetic field).

After the selection of the new frequency $f_1$, the vehicle 1 needs to transmit this new frequency $f_1$ to the mobile communication device 2. This transmission can be performed via the wireless connection (here Bluetooth) between the vehicle 1 and the mobile communication device 2.

As previously indicated, after pairing, the data transmitted over radio signals between the vehicle 1 and the mobile communication device 2 is encrypted using at least one secret key k shared by both sides. Thus, the new frequency $f_1$ is encrypted for its transmission, in a step S4, by the vehicle 1. In a step S5, the vehicle 1 transmits the encrypted frequency, noted $[f_1]$, to the mobile communication device 2, via the wireless (Bluetooth) connection.

After the random selection of the new frequency $f_1$, the vehicle 1 also starts rotating the magnet M at the frequency $f_1$ used as a frequency of rotation and the magnet M rotates at frequency $f_1$ in a step S6.

The mobile communication device 2 receives the new frequency encrypted $[f_1]$, via the wireless connection, in a step S7, and decrypts it using the shared key k, in a step S8.

In a step S9, the magnetic sensor 21 of the mobile communication device 2 detects and measures a magnetic field at the position of the communication device 2, with a given sampling frequency. This sampling frequency is equal or more than $2 \times f_1$. For example, the sampling frequency is equal to $F_{max}$ of the communication device 2. The communication device 2 can gather a batch of magnetic field measurements (measured samples of the magnetic field) during a predetermined duration. As an illustrative example, the mobile communication device 2 can gather one hundred samples (measurements) in one second.

In the first embodiment, the mobile communication device 2 measures the three orthogonal components $H_x$, $H_y$, $H_z$ of the magnetic field H.

Then, in the present embodiment, the mobile communication device 2 corrects the samples with its own rotation that is measured by the orientation sensor 22, in a step S10. Indeed, when the device 2 is in a hand, pocket, purse, or bag of the user, it can rotate. The mobile communication device 3 has to correct for this, when the three orthogonal components $H_x$, $H_y$, $H_z$ of the magnetic field are measured. The correction consists in applying a rotation matrix measured with the orientation sensor 22 to the measured samples, as well known by the person skilled in the art.

The magnetic field measured in step S9 is a global magnetic field that includes the magnetic field of the rotating magnet M and an environmental magnetic field.

In a following step S11, the mobile communication device 2 applies a frequency analysis on the measured magnetic field, after the correction of step S10. For example, the frequency analysis uses the Fast Fourier Transform (FFT). The FFT is applied to the samples gathered in the step S9. It allows to detect the magnetic field of the magnet M for the frequency $f_1$.

The magnetic field of the magnet M is noted $H_m$ and has three magnetic field components, noted $H_{Mx}$, $H_{My}$, $H_{Mz}$, in a cartesian coordinate system X, Y, Z, having an origin in the center of the magnet M. In the step S11, the mobile communication device 2 determines values of the three magnetic field components $H_{Mx}$, $H_{My}$, $H_{Mz}$. These values are obtained from the measurements of the (global) magnetic field via the frequency analysis. A correction for rotation is applied if necessary.

Then, in a step S12, the measured values of the magnetic field (here values of the three components $H_{Mx}$, $H_{My}$, $H_{Mz}$) of the magnet M are transmitted to the vehicle 1 via the wireless (here Bluetooth) connection. The three components $H_{Mx}$, $H_{My}$, $H_{Mz}$, form a magnetic field vector of the magnet M measured by the communication device 2.

In a step S13, the vehicle 1 receives the measured values of the magnetic field from the magnet M from the communication device 2.

In a step S14, the vehicle 1 compares the received values with the lookup table T stored in the vehicle 1 to estimate a position $P_{est}$ of the communication device 2 in a step S15.

The lookup table T contains predetermined reference values of the magnetic field of the magnet M in each of a plurality of predetermined discrete positions inside the vehicle 1 and in the environment around the vehicle 1, typically within the radio coverage area of the vehicle 1 (i.e., the short-range radio transceiver 10). In the first embodiment, the reference values include the values $H\_ref_{Mx}$, $H\_ref_{My}$, $H\_ref_{Mz}$ of the three orthogonal components of the magnetic field of the magnet M.

These predetermined discrete positions can correspond to the nodes of a three-dimensional grid covering the space inside the vehicle 1 and in the environment around the vehicle 1. The reference values of the magnetic field of the magnet M (here values of the three components $H\_ref_{Mx}$, $H\_ref_{My}$, $H\_ref_{Mz}$) are assigned to these nodes (or predetermined discrete positions). The lookup table T can be created in a configuration phase of the magnet M and stored in the vehicle 1 during its manufacturing.

The comparison made in the step S14 allows to estimate a position $P_{est}$ of the mobile communication device 2 from the values of the measured magnetic field of the magnet M received from the mobile communication device 2 in the step S15. For example, the vehicle 1 calculates a distance (e.g., Euclidian distance) between the measured magnetic field vector of the magnet M, having the three components $H_{Mx}$, $H_{My}$, $H_{Mz}$, and the reference magnetic field vector of the magnet M, having the three components $H\_ref_{Mx}$, $H\_ref_{My}$, $H\_ref_{Mz}$ for each of the nodes of the grid, and selects the node for which the distance is minimal.

Then, in a step S16, it is verified that the estimated position $P_{est}$ of the communication device 2 is allowable.

If the estimated position $P_{est}$ of the communication device 2 is allowable, the vehicle 1 controls the execution of the requested action in a step S17. In the present example, the vehicle doors are unlocked.

If the estimated position $P_{est}$ of the communication device 2 is not allowable, the requested action is refused and not performed by the vehicle 1, in a step S18. In the present case, the vehicle doors are not unlocked.

The character "allowable" or "not allowable" of the position of the communication device 2 may depend on the nature of the requested action. When the action is to unlock or lock the vehicle's door, the communication device 2 must be positioned in a predefined environment around the vehicle 1, for example within an area having a radius 10 meters around the vehicle, or inside the vehicle. When the action is to start the vehicle, the communication device 2 must be present inside the vehicle 1.

An attacker, who wants to make a relay station attack for example, needs to intercept and decipher the frequency $f_1$. The magnetic field information of the magnet M is part of the environmental magnetic field and cannot be extracted without knowing the frequency $f_1$.

To improve the security, the vehicle 1 can have N magnets with N≥2. In that case, at each request to perform an action, N new frequencies (preferably different from one another) are set, each frequency being assigned to one of the N magnets, and the N magnets are rotated at the N respective frequencies.

For example, the vehicle 1 has two magnets that are disposed at two different positions in the vehicle 1 and can rotate at two different respective frequencies $f_1$ and $f_2$.

The one frequency or the plurality of frequencies change with every event, i.e. at each request to perform an action. Furthermore, the new frequencies are transmitted over the air in an encrypted manner. All these measures contribute to improve the robustness of the system against relay station attack.

In a variant of the first embodiment, instead of measuring the three orthogonal components $H_x$, $H_y$, $H_z$ of the magnetic field H, the communication device 2 measures the magnitude B of the magnetic field, that can be expressed by the equation: $B=\sqrt{H_x^2+H_y^2+H_z^2}$. The samples (measurements) measured in the step S9 are values of the magnitude B of the magnetic field detected by the magnetic sensor 21 of the communication device 2.

In this variant, the step S10 of correction for the rotation of the communication device 2 is not necessary and consequently is not performed.

Then, the following steps S11 to S15 are performed using the magnetic field magnitude (instead of the three magnetic field components).

In the step S15 of estimating the position of the communication device 2, the vehicle 1 estimates a distance $d_1$ between the communication device 2 and the magnet M based on the following equation:

$$d_i = \left(\frac{B_M - D}{A}\right)^{-\frac{1}{C}},$$

where $B_M$ is a magnitude of the detected magnetic field of the magnet M, and A, C and D are predetermined constants, as disclosed in the article "A three-dimensional smartphone positioning method using a spinning magnet marker", published in 2017 Tenth International Conference on Mobile Computing and Ubiquitous Network (ICMU) by IEEE (Electronic ISBN:978-4-907626-31-0, DOI: 10.23919/ICMU.2017.8330076).

This distance $d_1$ defines a sphere centered on the magnet M and having a radius $d_1$. The vehicle 1 estimates that the position of the communication device 2 is somewhere on this sphere. The estimation of the distance $d_1$ is performed by comparing the received values of the magnitude of the magnetic field from the magnet M with the lookup table T stored in the vehicle 1. In that case, the lookup table T contains predetermined reference values of the magnitude of the magnetic field of the magnet M on each of a plurality of reference spheres centered on the magnet M. These reference spheres cover an area inside the vehicle 1 and in the environment around the vehicle 1, typically within the radio coverage area of the vehicle 1 (i.e., of the short-range radio transceiver 10).

In order to estimate more precisely the position of the communication device 2, the vehicle 1 can have two or more magnets, for example three rotating magnets, disposed in different locations in the vehicle 1.

In case that the vehicle 1 has three rotating magnets M_1, M_2 and M_3, the vehicle 1 can estimate three distances $d_1$, $d_2$, $d_3$ between the communication device 2 and the three magnets M_1, M_2 and M_3, based on the following equation:

$$d_i = \left(\frac{B_i - D}{A}\right)^{-\frac{1}{C}},$$

where $B_i$ is a magnitude of the detected magnetic field of the magnet M_i, i being an index of the magnet, and A, C and D are the predetermined constants.

The three distances $d_1$, $d_2$, $d_3$ define three spheres, the communication device 2 being positioned somewhere on each of the three spheres. Logically, the three spheres should have one common point of intersection (or a group of close points of intersection) that allow to estimate a position of the communication device 2.

Second Embodiment

The second embodiment is based on the first embodiment.

In the second embodiment, the steps S1 to S16 are performed and allow the vehicle 1 to determine a first estimated position $P_{est1}$ of the mobile communication device 2 and to verify that this first estimated position $P_{est1}$ is allowable.

When the first estimated position $P_{est1}$ is not allowable, the requested action is not executed (step S18) and the method is aborted.

Figure 5:
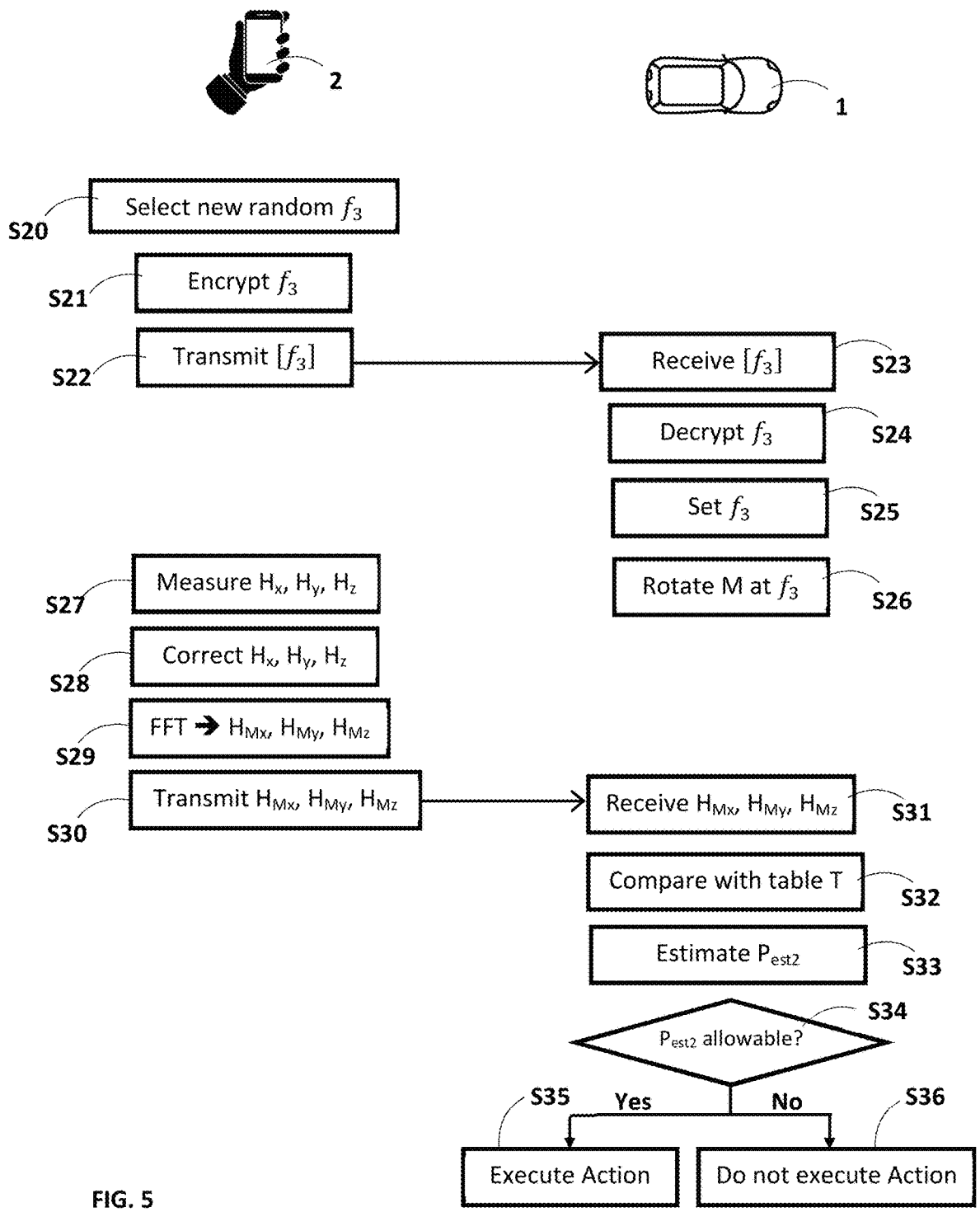
FIG. 5 shows a flowchart of a process of performing a location dependent action in the motor vehicle upon request from the mobile communication device, according to a second embodiment.

When the first estimated position $P_{est1}$ is allowable, new steps S20 to S35 or S36 (explained below) are executed, as shown in FIG. 5.

In the step S20, the communication device 2 selects a new frequency $f_3$ for the magnet [0094]. M, and then transmits this new frequency $f_3$ to the vehicle 1 (step S22) via the wireless connection (here Bluetooth connection), advantageously after an encryption with the shared key k (step S21). The frequency $f_3$ is different from the previous frequency $f_1$. This new frequency $f_3$ can be selected randomly (or pseudo-randomly).

In a step S23, the vehicle 1 receives the new frequency (encrypted) and decrypts it in a step S24. In the step S25, the vehicle 1 sets the new frequency $f_3$ as the new rotation frequency of the magnet M.

The steps S6 and S9-S16 are repeated and referenced as steps S26 to S33 in FIG. 5 but using the new frequency $f_3$, as shown in FIG. 5. This allows the vehicle 1 to determine a second estimated position $P_{est2}$ of the mobile communication device 3.

When the two estimated positions $P_{est1}$ and $P_{est2}$ are allowable, the vehicle 1 executes the requested action in a step S35.

When one of the two estimated positions $P_{est1}$ and $P_{est2}$ is not allowable, the vehicle 1 does not execute the requested action (step S18 or S36).

Optionally, in an additional step (not represented), the vehicle 1 compares the two estimated positions $P_{est1}$ and $P_{est2}$ with one another and verifies that they are coherent. The two estimated positions are coherent when they are close enough to each other. The distance between the two estimated positions $P_{est1}$ and $P_{est2}$ must be less that a predefined maximum distance. This maximum distance may depend on the nature of the action requested. In that case, the vehicle 1 executes the requested action when the two estimated positions $P_{est1}$ and $P_{est2}$ are allowable and consistent, and does not execute the requested action when at least one of the two estimated positions is not allowable or when the two estimated positions are not coherent.

When the vehicle has N magnets with N≥2, the communication device 2 selects randomly (or, alternatively, pseudo-randomly) the N new frequencies, for example $f_3$, $f_4$ when N=2, and transmits them to the vehicle 1, preferably in an encrypted manner. The vehicle 1 receives the N encrypted frequencies and decrypt them before rotating the N magnets at the respective N frequencies.

The second embodiment could also be based on the variant of the first embodiment, wherein the magnitude of the magnetic field is used to estimate the position of the communication device 2.

In a variant of the second embodiment, the first random (or pseudo-random) selection of one or more frequencies is performed by the communication device 2 and the second random (or pseudo-random) selection of one or more frequencies is performed by the vehicle 1.

In case that the vehicle 1 and the mobile communication device 2 are connected to a global mobile telecommunication network (not represented), the new frequency or frequencies could be transmitted between the vehicle 1 and the communication device 2 through to this global mobile communication network.

The methods presently disclosed are implemented with hardware means (or components) and software means (or components). The present disclosure also concerns: a computer program including instructions to cause the control system 100 of the vehicle 1 to execute the steps, performed by the vehicle 1 (or a control system of the vehicle), of the method for performing a location dependent action in the system having the vehicle and the mobile communication device, according to any of the previously described embodiments; and a computer-readable medium having stored there on the computer program; and a computer program including instructions to cause the mobile communication device 2 to execute the steps, performed by the mobile communication device 2, of the method for performing a location dependent action in the system having the vehicle and the mobile communication device, according to any of the previously described embodiments; and a computer-readable medium having stored thereon the computer program.

What is claimed is:

1. A method comprising:
   (A) setting, by a vehicle and in response to a request from a mobile communication device to perform an action, N frequencies, each frequency being assigned to one of N magnets, N being equal to or greater than one, the mobile communication device being connected to the vehicle via a short-range radio connection;
   (B) rotating the N magnets at the N frequencies;
   (C) receiving values of a magnetic field of each of the N magnets detected by the mobile communication device;
   (D) estimating a position of the mobile communication device based on the received values; and
   (E) controlling execution of the action when the position is allowable, the action being a location dependent action.

2. The method of claim 1, wherein the N frequencies are selected randomly or pseudo-randomly.

3. The method of claim 2, wherein the random or pseudo-random selection of the N frequencies is performed by the vehicle.

4. The method of claim 1, the method further comprising:
   encrypting, by the vehicle, the N frequencies; and
   transmitting, by the vehicle, the N frequencies to the mobile communication device via the short-range radio connection.

5. The method of claim 1, wherein the position of the mobile communication device is estimated by comparing values of orthogonal components of the magnetic field with a look-up table stored in the vehicle.

6. The method of claim 1, wherein the position of the mobile communication device is estimated by estimating a distance between the mobile communication device and each of the N magnets based on the following equation:

$$d_i = \left(\frac{B_i - D}{A}\right)^{-\frac{1}{C}},$$

where i is a magnet index, $B_i$ is a magnitude of the magnetic field of a respective magnet, and A, C and D are predetermined constants.

7. The method of claim 1, the method further comprising:
   executing steps A) to D) twice to estimate two consecutive positions of the mobile communication device, N first frequencies being selected randomly or pseudo-randomly by the vehicle or the mobile communication device for a first execution of the steps A) to D), N second frequencies being selected randomly or pseudo-randomly by the vehicle or the mobile communication device for a second execution of the steps A) to D), the vehicle selecting the N first frequencies or the N second frequencies for one of the first execution or the second execution of steps A) to D); and in step E), performing the action if the two estimated positions are allowable.

8. The method of claim 7, wherein the two consecutive positions are compared with one another and the requested action is performed if the two consecutive positions are coherent with one another.

9. A control system comprising:
a short-range radio transceiver;
N magnets, N being equal to or greater than one; and
a processor configured to:
(A) set, in response to a request from a mobile communication device to perform an action, N frequencies, each frequency being assigned to one of the N magnets, the mobile communication device being connected to a vehicle via a short-range radio connection;
(B) rotate the N magnets at the N frequencies;
(C) receive values of a magnetic field of each of the N magnets detected by the mobile communication device;
(D) estimate a position of the mobile communication device based on the received values; and
(E) control execution of the action when the position is allowable, the action being a location dependent action.

10. The control system of claim 9, wherein the control system is integrated within the vehicle.

11. The control system of claim 9, wherein the N frequencies are selected randomly or pseudo-randomly.

12. The control system of claim 11, wherein the random or pseudo-random selection of the N frequencies is performed by the vehicle.

13. The control system of claim 9, wherein the processor is further configured to:
encrypt the N frequencies; and
cause the vehicle to transmit the N frequencies to the mobile communication device via the short-range radio connection.

14. The control system of claim 9, wherein the position of the mobile communication device is estimated by comparing values of orthogonal components of the magnetic field with a look-up table stored in the vehicle.

15. The control system of claim 9, wherein the position of the mobile communication device is estimated by estimating a distance between the mobile communication device and each of the N magnets based on the following equation:

$$d_i = \left(\frac{B_i - D}{A}\right)^{-\frac{1}{C}},$$

where i is a magnet index, $B_i$ is a magnitude of the magnetic field of a respective magnet, and A, C and D are predetermined constants.

16. The control system of claim 9, wherein the processor is further configured to:
execute steps A) to D) twice to estimate two consecutive positions of the mobile communication device, N first frequencies being selected randomly or pseudo-randomly by the vehicle or the mobile communication device for a first execution of the steps A) to D), N second frequencies being selected randomly or pseudo-randomly by the vehicle or the mobile communication device for a second execution of the steps A) to D), the vehicle selecting the N first frequencies or the N second frequencies for one of the first execution or the second execution of steps A) to D); and
in step E), perform the action if the two estimated positions are allowable.

17. The control system of claim 16, wherein the two consecutive positions are compared with one another and the requested action is performed if the two consecutive positions are coherent with one another.

18. A method comprising:
obtaining, by a mobile communication device and in response to a request from the mobile communication device to perform an action, N frequencies, each frequency being assigned to one of N magnets, N being equal to or greater than one, the mobile communication device including a magnetic sensor and being connected to a vehicle via a short-range radio connection, the N magnets being rotated at the corresponding assigned N frequencies;
measuring, by the mobile communication device using the magnetic sensor, a global magnetic field;
performing, by the mobile communication device, a frequency analysis using the N frequencies to detect values of a magnetic field of each of the N magnets; and
transmitting, by the mobile communication device, the values of the magnetic field of each of the N magnets to the vehicle (1), the values of the magnetic field effective to allow the vehicle to estimate a position of the mobile communication device and control execution of the action if the position is allowable, the action being a location dependent action.

19. The method of claim 18, wherein the N frequencies are selected randomly or pseudo-randomly.

20. The method of claim 18, wherein the position of the mobile communication device is estimated by comparing values of orthogonal components of the magnetic field with a look-up table stored in the vehicle.

* * * * *